United States Patent [19]
Hoback

[11] 4,041,789
[45] Aug. 16, 1977

[54] BELT DRIVE INCLUDING TOOTHED BELTS AND TOOTHED PULLEYS OF IMPROVED TOOTH CONFIGURATIONS

[75] Inventor: Ronald D. Hoback, Lincoln, Nebr.

[73] Assignee: The Goodyear Tire & Rubber Company, Akron, Ohio

[21] Appl. No.: 642,089

[22] Filed: Dec. 18, 1975

[51] Int. Cl.² .................. F16G 1/28; F16H 55/30; F16H 7/00

[52] U.S. Cl. .................. 74/229; 74/243 R; 74/231 C

[58] Field of Search .................. 74/231 C, 243 R, 229

[56] References Cited
U.S. PATENT DOCUMENTS

| | | | |
|---|---|---|---|
| 3,313,166 | 4/1967 | Elster | 74/231 C X |
| 3,756,091 | 9/1973 | Miller | 74/243 R X |
| 3,977,265 | 8/1976 | Worley et al. | 74/231 C |

Primary Examiner—Leonard H. Gerin
Attorney, Agent, or Firm—F. W. Brunner; R. P. Yaist

[57] ABSTRACT

A belt drive including a toothed power transmission belt and toothed pulley or pulleys operating in conjunction and each having an improved tooth configuration. Each belt tooth as viewed in longitudinal cross-section includes stress relieving portions or fillets adjoining the opposite sides of the base of the tooth. Each fillet has an outer perimeter or outer surface area which is at least 30% of one half of the total outer perimeter or outer surface area of the belt tooth. The pulley in cross section includes an outermost portion having an arcuate outer perimeter formed by the arc of at least one circle whose center point lies within the pulley tooth with one half of the arcuate outer perimeter or outer surface area being at least 30% of one half of the total outer perimeter or outer surface area of the tooth.

43 Claims, 6 Drawing Figures

BELT DRIVE INCLUDING TOOTHED BELTS AND TOOTHED PULLEYS OF IMPROVED TOOTH CONFIGURATIONS

BACKGROUND OF THE INVENTION

This invention relates to belt drives in which toothed power transmission belts operate in conjunction with tooth gears or pulleys and to belts and pulleys adapted for use in such drives. More particularly this invention relates to a power transmission belt of the positive drive type having an improved belt tooth profile for increased shear resistance. This invention also relates to a novel pulley for use with such a belt, for example, in a synchronous or positive drive system in which the positive drive transmission belt operates in conjunction with a pair of such toothed pulleys.

Power transmission belts used with toothed pulleys are well-known in the art. These belts have a plurality of alternating teeth and grooves extending generally transversely of the belt which mesh with alternating teeth and grooves of the toothed pulley or sprocket in order to perform their driving function. The most widely used of these toothed belts are the so-called synchronous or positive drive belts which are manufactured from flexible resilient material such as natural or synthetic rubber. These belts are engineered and manufactured with pitch, tooth depth, width and other measurements accurate to a precise degree with extremely close tolerances being maintained. In addition, a high strength tensile stress-resisting member of essentially inextensible material is provided substantially on the dedendum line of the teeth to prevent undue stretchability of the belt. This belt construction allows the flexible, resilient belt teeth to mesh without substantial change of pitch with teeth of the toothed pulleys with the belt thereby functioning as a synchronizing belt. The operation and advantages of synchronous drive belts are fully described in Case U.S. Pat. No. 2,507,852.

Typically the belt driving teeth of the positive drive belt have been of a rectilinear cross sectional configuration and most commonly have been of a trapezoidal configuration when viewed in longitudinal cross section. The spacing or width of the grooves between the belt teeth originally was designed so as to be greater than the width of the root or base of the belt tooth. However, problems were encountered with belt failure due to shearing of the belt teeth resulting from the concentration of stresses in the belt. Consequently, many efforts were made to modify the existing belt tooth profile in order to solve the tooth shear problem. For example, in order to achieve a more satisfactory distribution of the load or stress on the belt, the number of belt teeth for a given length of belt has been increased. In addition, a larger size of individual belt tooth has been manufactured to provide a greater resistance to tooth shear. These approaches naturally have decreased the space between belt teeth so that the width of the root or base of the belt tooth is equal to or greater than the space between the teeth.

More recently various changes in the contour or configuration of the belt tooth have been made together with the approaches discussed above. For example, Miller U.S. Pat. No. 3,756,091 discloses a positive drive system in which the belt includes relatively closely spaced together driving teeth of a special curvilinear cross sectional configuration which is operated in conjunction with pulley teeth having mating substantially conjugate curvilinear cross sections.

The belt modifications as discussed previously which were implemented to counter the belt tooth shear problem have created other problems due to the relative spacing of the belt teeth. For example, the tensile member of the positive drive belts in the heretofore existing systems have not been adequately supported by the teeth of the belt and therefore have been subjected to excessive stress in the area between teeth during the operation of the drive. This problem has been particularly acute in drives wherein the base or root of the tooth as measured substantially on the dedendum line of the tooth is greater than the space between the tooth as measured on this same line. In this instance the pulley teeth which contact the spaces between the belt teeth have a relatively small apex and the condition resulting may be likened to the belt passing over knife blades. Additionally, excessive vibration and undesirable noise also have been encountered.

Conventionally in the prior art the dimensional relationship of the belt teeth and grooves and the pulley teeth and grooves has been such that in the longitudinal extent of the belt between the pulleys the height of the belt teeth is equal to or less than the depth of the pulley grooves. Consequently, as the belt travels around the pulleys either a line to line contact is established between the extreme outwardly facing portions of the belt teeth which confront the pulley and the portions of the pulley disposed between the pulley teeth which define the bottom of the pulley grooves or there is a clearance between these stated portions of the belt teeth and pulley grooves.

Problems have been encountered in conventional positive drive systems with the existing dimensional relationships between the belt and the pulley teeth or grooves as discussed above. A solution to this problem is set forth in my co-pending application entitled "IMPROVED BELT DRIVE AND BELTS AND PULLEYS THEREFOR" which discloses a belt drive including belts and pulleys wherein the dimensional relationship between the belt teeth and the pulley teeth is such that in the longitudinal extent of the belt between the pulleys the height of the belt tooth is greater than the height of the pulley teeth or depth of the pulley grooves while as the belt travels around the pulleys the extreme outwardly facing portions or outer extremities of the belt teeth contact the bottom of the pulley grooves. At the same time the belt teeth are compressed to reduce their height so that the extreme radially outwardly facing portions or outer extremities of the pulley teeth come in contact with the bottoms of the belt grooves. The height of the pulley teeth provides more support for the tensile member of the positive drive belt thereby reducing the stresses in the area of the belt between the teeth during the operation of the drive.

It has been found that the disadvantage of the prior art can be overcome by the present invention which will be hereinafter described.

OBJECTS OF THE INVENTION

It is a primary object of the present invention to provide a power transmission belt having a plurality of flexible resilient teeth of an improved cross sectional configuration which will exhibit an improved resistance to shear.

It is also an object of the present invention to provide a pulley having a plurality of radially projecting teeth of novel cross sectional configuration for use in conjunction with such a power transmission belt.

It is another important object of the present invention to provide a positive drive system including a toothed power transmission belt and at least one toothed pulley of the type described in which the stresses on the belt driving teeth are reduced.

It is still another object of the present invention to provide a positive drive system in which the positive drive belt of such system operates with a more constant angular velocity and less vibration resulting in a smoother quieter running drive.

Other objects and advantages of this invention will become apparent hereinafter as the description thereof proceeds, the novel features, arrangement and combinations being clearly pointed out in the specification as well as the claims thereunto appended.

It has been found in accordance with the present invention that the beforementioned objects can be accomplished by providing a flexible power transmission belt having a plurality of flexible resilient teeth of uniform pitch length extending generally transversely thereof. Each tooth as viewed in longitudinal section comprises a base portion, an outermost portion spaced from the base portion and having a cross sectional dimension less than the cross sectional dimension of the base portion and opposite side portion extending from the ends of the base portion and converging inwardly to meet the ends of the outermost portion to thereby define the tooth profiles. Each side portion includes an integral stress-relieving portion adjoining the base portion with the stress-relieving portion having an outer perimeter which is at least 30% of one half of the total outer perimeter of said tooth.

The above-mentioned objects are also accomplished by providing a toothed pulley for use with a tooth power transmission belt with the pulley having a plurality of uniformly spaced radially projecting teeth. Each tooth as viewed in planes perpendicular to the rotational axis of the pulley comprising a base portion, an outermost portion spaced from the base portion, and opposite side portions extending upwardly from the ends of the base portion joining the ends of the outermost portion to thereby define the pulley tooth profile. The outermost portion has an outer perimeter formed by at least one arc of a circle whose center point lies within the tooth with one half of the outer perimeter of the arc being at least 30% of one half of the total outer perimeter of the tooth.

The objects and advantages of the present invention are further achieved by providing a positive drive system comprising the combination of a positive drive belt and a pair of toothed pulleys operating in conjunction therewith. The belt includes a body of flexible polymeric material having a tensile member of high modulus essentially inextensible material embedded therein and a plurality of driving teeth of substantially uniform cross sectional configuration formed in at least one surface thereof. The teeth extend generally transversely of the belt and are adapted to mesh without any significant change of pitch with the teeth of the toothed pulleys. The tensile member is disposed substantially on the dedendum line of the driving teeth of the belt and each driving tooth of the belt when viewed in longitudinal cross section as the belt travels around the pulleys comprises a base portion nearest to the tensile member and opposite pulley tooth contacting portions extending from the ends of the base portion and converging inwardly to form the outermost portion of the tooth and thereby defining the tooth profile. Each pulley contacting portion includes a fillet of flexible resilient material integrally joined to the base portion. Each fillet has a surface contacting area which is at least 30% of the total surface contacting area of one of the pulley tooth contacting portions to thereby increase the shear-resistance of each belt tooth.

DESCRIPTION OF THE PREFERRED EMBODIMENTS

Figure 1:
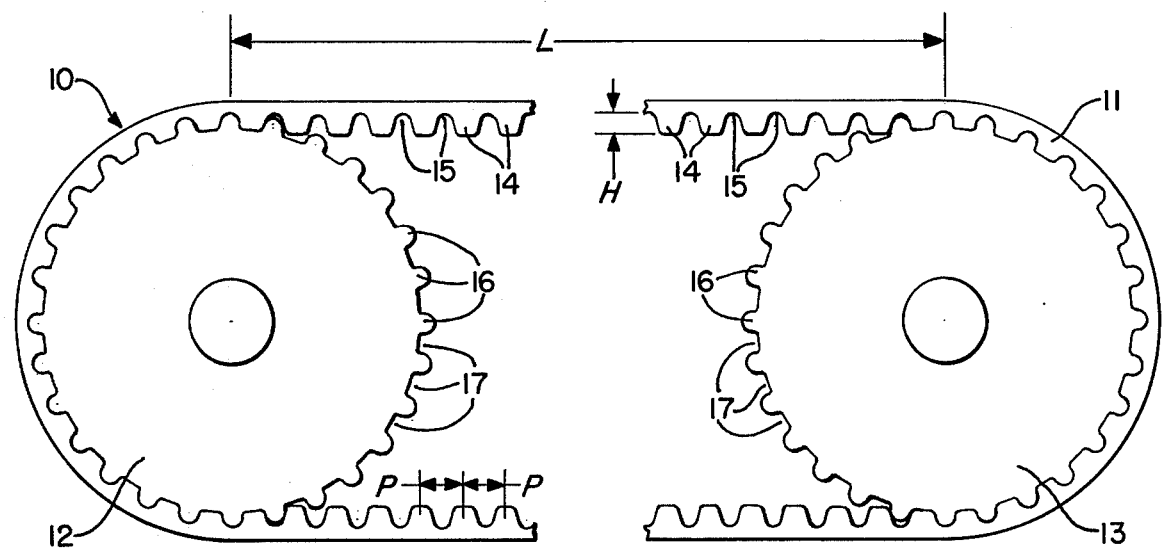
FIG. 1 is a side elevational view of the positive drive system of this invention including the belt and pulleys with parts broken away.

Referring now to the drawings, in FIG. 1 a belt drive 10, for example, a positive drive system is shown which includes a flexible power transmission belt 11 trained around a pair of gears or pulleys 12 and 13. The belt 11 includes a plurality of alternating teeth 14 and grooves 15 extending generally transversely thereof. The pulleys 12 and 13 have a plurality of alternating teeth 16 and grooves 17 extending generally axially thereof which mesh or engage with the belt teeth 14 and grooves 15 during the operation of the drive 10. In the particular arrangement shown in FIG. 1 the belt 11 is used to transmit power from the toothed driving pulley 12 to a toothed driven pulley 13. Of course, it is to be understood that either pulley of the drive could be the driver pulley and that additional pulleys both toothed and untoothed could be included in the drive.

Figure 2:
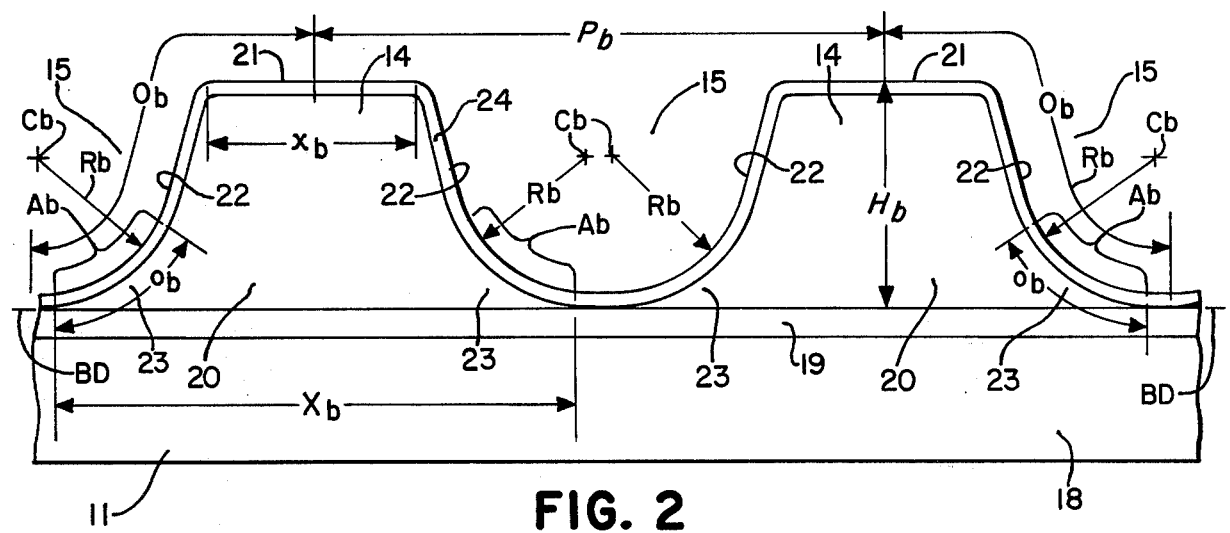
FIG. 2 is an enlarged fragmentary side elevational view of the belt of FIG. 1 more clearly showing the novel cross sectional configuration of the belt teeth.

The belt 11 as best illustrated in FIG. 2 is of the positive or synchronous drive type. The belt 11 includes a body 18 of flexible polymeric material such as natural or synthetic rubber or the like. The body 18 of the belt 11 includes a tensile member 19 of high modulus essentially inextensible material such as wrapped strands of glass fiber or steel to provide the belt with the necessary longitudinal strength and stability. The flexible resilient belt driving teeth 14 of substantially uniform height $H_b$ and pitch length $P_b$ extend generally transversely of the belt 11. The teeth 14 are integrally formed in at least one surface of the body 18 with the teeth extending transversely of the belt 11. If desired the driving teeth can be formed in each surface of the body 18.

The tensile member 19 is disposed substantially on the dedendum line BD of the driving teeth 14 of the belt 11 as is the well-known practice in regard to synchronous drive belts (Case U.S. Pat. No. 2,507,852). The high strength tensile number 19 functions to prevent undue stretchability of the belt 11 and allows the teeth 14 to mesh more accurately with the teeth 16 of the pulleys 12 and 13.

Each tooth 14 as viewed in longitudinal section includes a base portion or root 20 nearest to the tensile member 19, an outermost portion or crown 21 furthest from the tensile member 19 which is spaced from the base portion 20 and has a cross sectional dimension $xb$ less than the cross sectional dimension $Xb$ of the base portion 20. Opposite side portions or flanks 22 extend from the ends of the base portion 20 to meet or join with the ends of the outermost portion 21 to thereby define the belt tooth profile.

Each side portion 22 includes an integral stress-relieving portion or fillet 23 adjoining the base portion 20. The stress-relieving portion 23 has an outer perimeter or outer surface area $ob$ which is at least 30% of one-half the total outer perimeter or outer surface area $Ob$ of the belt tooth 14. In the prior art typically belt tooth fillets have an outer perimeter or surface area which is less than 30% of one half of the outer perimeter or surface area of the belt tooth and generally in the neighborhood of about 14 to about 29% of one half of the total outer perimeter or surface area of the belt tooth.

The enlarged portions or fillets 23 serve to distribute the stresses to which the belt teeth 14 are subjected during the operation of the drive 10 when contacting the pulley teeth 16. Each fillet 23 relieves the stresses at its respective end of the base or root 20 of the tooth 14 and consequently increases the belt tooth shear resistance thereby increasing the life of the belt 11.

It is preferred that each portion or fillet 23 of the tooth 14 have an outer perimeter or surface area $Ob$ which is from about 35 to about 100% of surface area $Ob$ which is one half of the total outer perimeter or outer surface area of one of the belt teeth 14. It is even more preferred that this figure be from about 40 to about 60% of surface area $Ob$ Optimum results have been achieved in improving belt tooth shear resistance when the fillet 23 has constituted about 50% of the total outer perimeter or surface area $Ob$ of the belt tooth 14.

As shown in FIG. 2, the stress-relieving portion or fillet 23 may have a curvilinear outer perimeter $Ob$ when viewed in longitudinal cross section which, for example, is defined by an arc $Ab$ of a circle. whose center lies between the belt teeth 14. Stated differently, it may be said that the fillet 23 has a curvilinear outer surface $ob$ the edge of which is formed by the arc $Ab$ of at least one circle whose center $Cb$ lies outside of the body 18 of the belt 11 in the space or groove 15 between the belt teeth 14. It has been determined that the ratio of the radius $Rb$ of the arc $Ab$ to the pitch length $Pb$ between adjacent teeth 14 should be from about 0.16:1 to about 0.32:1.

The belt driving teeth 14 are preferably formed by molding but may be ground or cast if desired. The teeth 14 also preferably include a wear-facing 24 of textile fabric material for example, of woven nylon. Each belt driving tooth 14 is engineered and manufactured to a precise degree with very close tolerances being maintained so that during the operation of the belt drive system 10 the belt teeth 14 are adapted to mesh without any significant change of pitch with the teeth 16 of the toothed pulleys 12 and 13.

Figure 3:
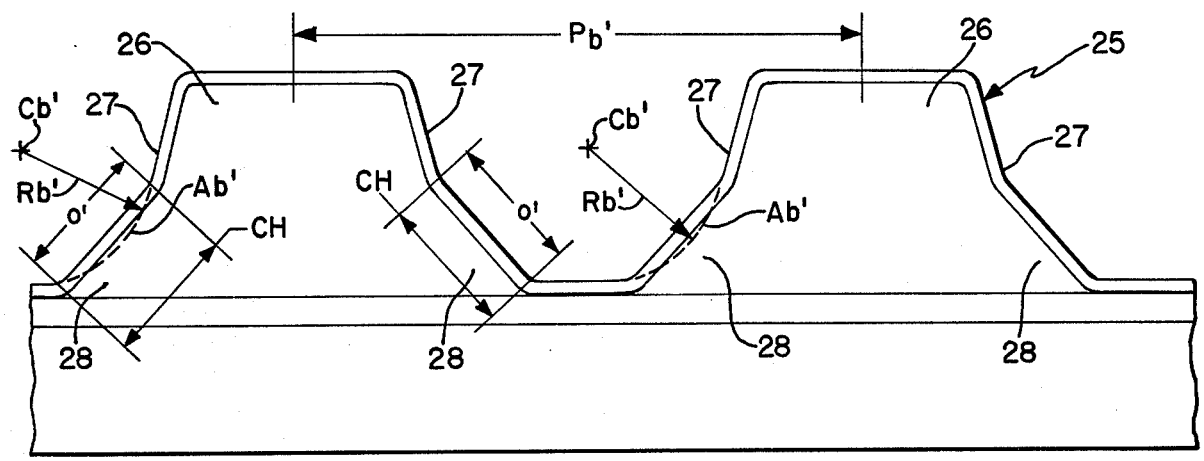
FIG. 3 is a modification of the invention shown in FIG. 2.

In a modification of the invention shown in FIG. 3, the power transmission belt 25 has a plurality of flexible resilient teeth 26 the opposite sides or flanks 27 of which include a stress-relieving portion or fillet 28 whose outer perimeter $o'$ is rectilinear and is defined by the chord CH of an arc $Ab'$ of a circle whose center $Cb'$ lies between adjacent belt teeth 26. In other words, the fillet 28 has a rectilinear outer surface $o'$ the edge of which is formed by at least one chord CH of an arc $Ab'$ of a circle whose center $Cb'$ lies outside of the body 18 between the belt teeth 14. The outer perimeter or outer surface area $ob'$ has generally the same relationship to one-half of the total outer perimeter or outer surface area $Ob'$ as in the case of the belt of FIG. 2. It is preferred that the ratio of the radius $Rb'$ of the arc $Ab'$ to the pitch length $Pb'$ between adjacent teeth 26 be from about 0.16:1 to about 0.32:1.

Figure 5:
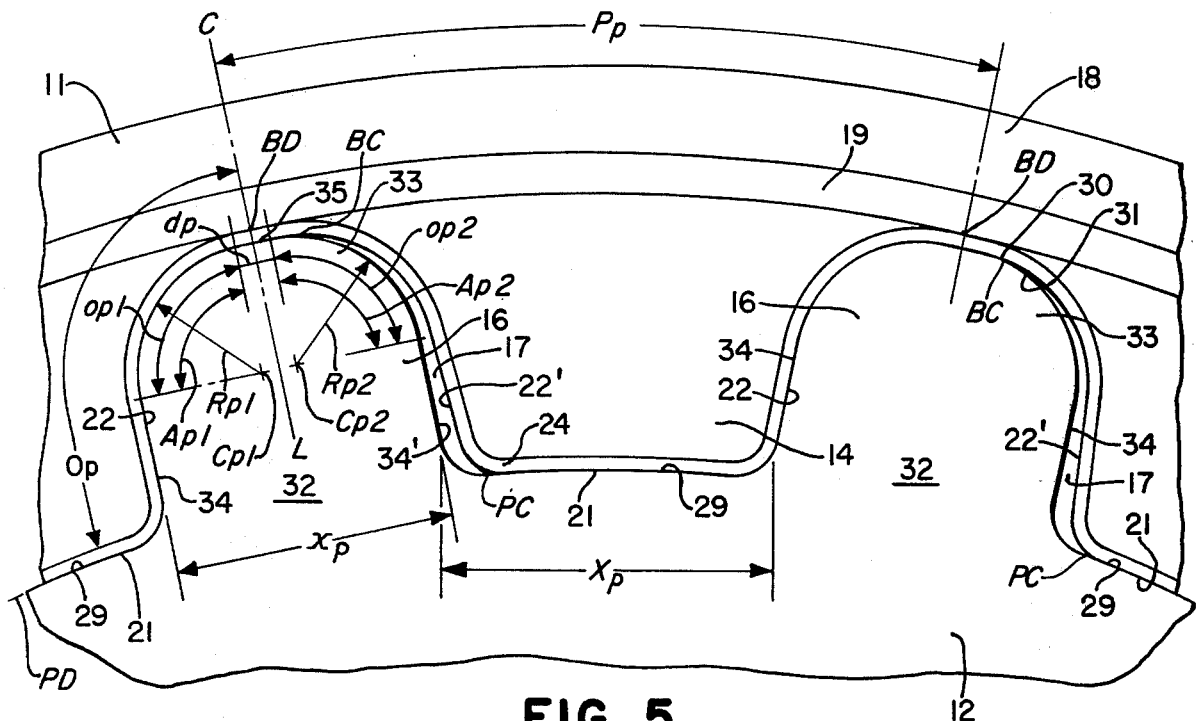
FIG. 5 is an enlarged fragmentary side elevational view of the invention as shown in FIGS. 1 and 4 which more clearly illustrates the configuration of the pulley of the invention.
Figure 4:
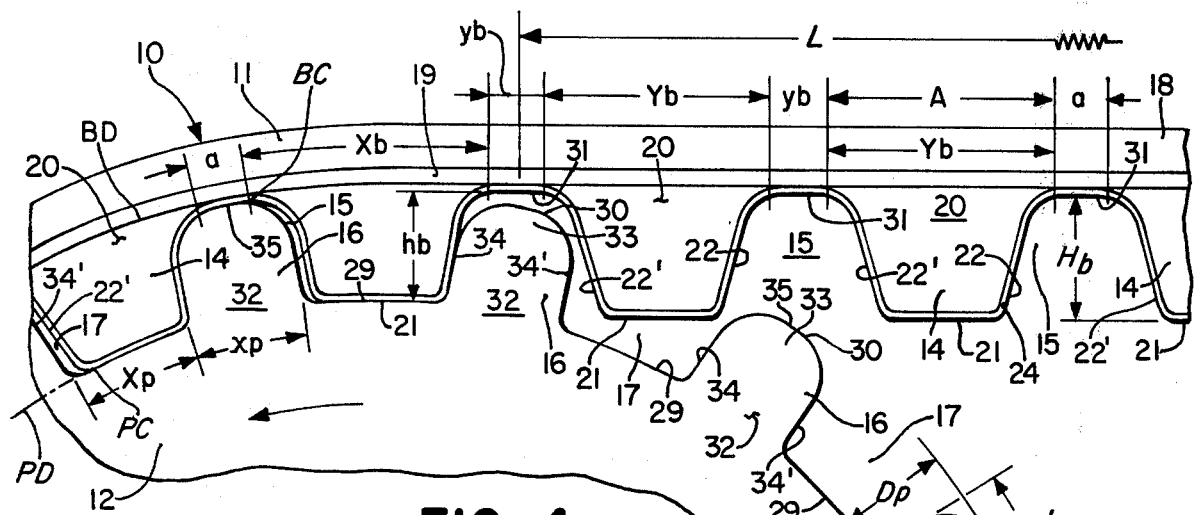
FIG. 4 is an enlarged fragmentary side elevational view of FIG. 1 with parts broken away to more clearly show the contact between the toothed belt and toothed pulley of the invention.

The structural features of the pulleys 12 of the present invention are best seen in FIGS. 4 and 5. The pulley 12 includes a plurality of uniformly spaced radially projecting teeth 16. Each tooth 16 as viewed in planes perpendicular to the rotational axis of the pulley 12 includes a base portion or root 32, an outermost portion or crown 33 spaced from the base portion 32 and opposite side portions 34 extending from the ends of said base portion 32 joining the ends of the outermost portion 33 to thereby define the pulley tooth profile. The side portions or flanks 34 may be considered generally parallel but may diverge slightly outwardly from the crown 33 to the root 32 of the pulley tooth 16 as shown in FIGS. 4 and 5 or they may even converge slightly inwardly if desired.

Each half of the outermost portion 33 includes an arcuate outer perimeter $op$ formed by the arc $Ap$ of at least one circle whose centerpoint $Cp$ lies within the tooth 16 with the arcuate outer perimeter $Op$ being at least 30% of one-half of the total outer perimeter $Op$ of the tooth 16. For example, as shown in FIG. 5 the outermost portion 33 has an arcuate outer perimeter $op1$ and $op2$ formed by the arcs $Ap1$ and $Ap2$ of two circles of equal radius $Rp1$ and $Rp2$ spaced at an equal distance from the radial center line CL of the tooth 16 with the arcs $Ap1$ and $Ap2$ connected by a flat portion 35 therebetween. The flat portion 35 has a linear dimension $dp$ less than the length of any one of the arcs $Ap1$ and $Ap2$.

It is preferred that the arcuate outer perimeter or surface area $op$ of one half of the outermost portion 33 of the pulley tooth 16 be from about 35 to about 100% of one-half of the total outer perimeter or surface area $Op$ of the pulley tooth 16. It is even more preferred that this figure be from about 40 to about 60% of one-half of the total surface area $Op$ of one of the teeth 16. Optimum results have been achieved when the arcuate outer perimeter or surface area $op$ constitutes about 50% of the approximate one half of the total outer perimeter or surface area $Op$ of the pulley tooth 16.

Figure 6:
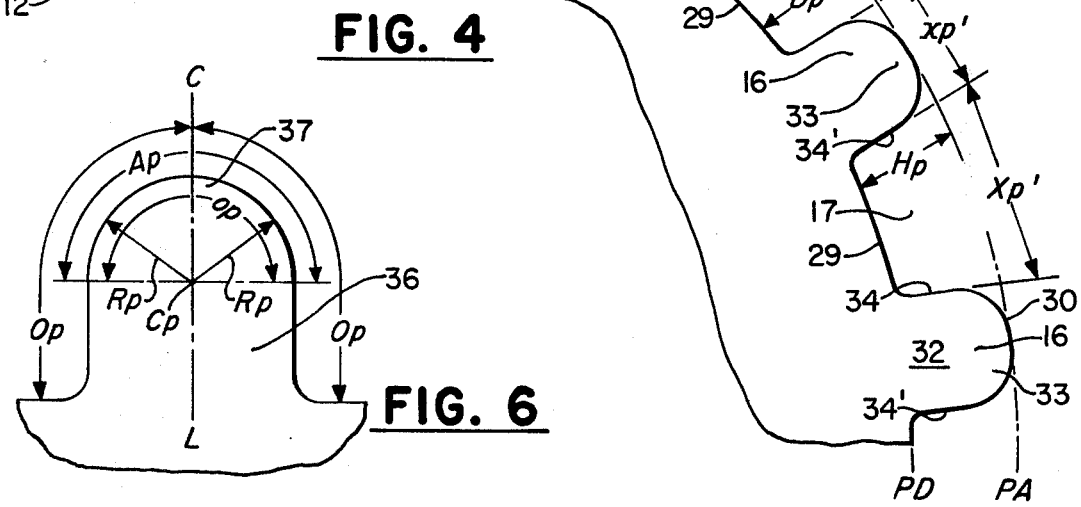
FIG. 6 is a modification of the pulley of the invention shown in FIG. 4.

In the modification of the invention shown in FIG. 6 the pulley tooth 36 includes an outermost portion or crown 37 having an outer arcuate perimeter $op$ formed by the arc $Ap$ or a single circle whose center $Cp$ lies on the radial center line CL of the tooth 36. In this case the crown is of a generally semi-circular configuration and the outer perimeter of the arc $Ap$ may be related to the total outer perimeter (2 times $Op$) of the pulley tooth.

It has been determined that the radius $Rp$ of the arc or arcs $Ap$ forming the arcuate outer perimeter $op$ of the outermost portion of the pulley can be determined by the following formula $R = 0.165P + 0.0012P (N-9)$ wherein:
$R$ = the radius of the arc
$P$ = the circular pitch of the pulley teeth
$N$ = the number of pulley teeth.

As best shown in FIGS. 1 and 4, it is preferred that the dimensional relationship of the belt teeth 14 and grooves 15 and the pulley teeth 16 and grooves 17 be such that in the longitudinal extent L of the belt 11 between the pulleys the height H$b$ of the belt tooth 14 is greater than the depth D$p$ of the pulley grooves 17. As the belt 11 travels around the pulleys 12 and 13 the extreme outwardly facing portions or outer extremities 21 of the addendum of the belt teeth 14 which confront the pulleys 12 and 13 come into contact with the portions or surfaces 29 of the dedendum of the toothed pulley 12 disposed between the pulley teeth 16 which define the bottom of the pulley groove 17. At the same time the belt teeth 14 are compressed to reduce their height h$b$ so that the radially outwardly facing portions or outer extremities 30 of the addendum of the pulley teeth 16 come into contact with the portions or surface 31 of the addendum of the belt 11 disposed between the belt teeth 14 which define the bottom of the belt grooves 15.

It is preferred that the height H$b$ of each belt tooth in the longitudinal extent L of the belt be a maximum of about 20% greater than the depth D$p$ of each pulley groove 17 or the height H$p$ of each pulley tooth 16 in order to achieve efficient operation of the drive 10. In this regard it is preferred that the height H$b$ of the belt tooth 14 be from about 1 to about 15% greater than the depth D$p$ of each pulley groove 17 or conversely that the height H$p$ of each tooth 16 of the pulley 12 be from about 1 to about 15% less than the height H$b$ of each driving tooth 14 of the belt 11 in engagement therewith. It is even more preferred that the height H$b$ of each belt tooth 14 be about 3 to about 7% greater than the depth D$p$ of each pulley groove 17 or the height H$p$ of each pulley tooth 16. For optimum results the height H$b$ of each belt tooth 14 should be about 5% greater than the depth D$p$ of each pulley groove 17 or the height H$p$ of each pulley tooth 16.

It can be observed by reference to FIG. 4 that the belt driving teeth 14 of increased relative height which become compressed upon contact with the surfaces 29 of the dedendum of the pulley 12 between the pulley teeth 16 provide support for the tensile member 19 in the toothed area A of the belt in which each belt tooth 14 is joined to the belt body 18. Thus the perpendicular stresses acting on the tensile member 19 are reduced in the untoothed area $a$ of the belt generally adjacent to surfaces 31 between the belt teeth 14.

For the purposes of this invention, the height of the belt teeth is the shortest distance from the dedendum line to the outer extremity of the addendum of the tooth. The height of the pulley teeth the radial distance from the dedendum line of the pulley to the radial outer extremity of the pulley tooth.

The concepts of the present invention can be utilized to the greatest extent in providing support for the tensile member 19 wherein the circumferential dimension X$b$ of the base or root 20 of each belt tooth 14 as measured on its dedendum line BD is equal to or greater than the circumferential dimension $xp$ of the root 32 of each pulley tooth 16 as measured on its dedendum line PD as the belt 11 rotates about the pulleys 12 and 13. For instance, the invention is particularly important when the ratio of the dimension X$b$ of the root of each belt tooth 14 to the dimension $xp$ of the root 32 of each pulley tooth 16 is as high as from about 1¼ to about 1¾ to 1. To state this condition of greatest utilization differently, as the belt 11 travels around the pulleys 12 and 13 the circumferential dimension X$b$ of each belt driving tooth 14 as measured on its dedendum line BD is equal to or greater than the circumferential dimension $xp$ of each pulley tooth 16 as measured on its dedendum line PD with the circumferential dimension X$b$ of each belt driving tooth 14 being about 1¼ to 1¾ as great as the circumferential dimension X$p$ of each pulley tooth 16.

It naturally follows that along the longitudinal extent L of the belt 11 the width or lineal dimension Y$b$ of the root 20 of each tooth 14 of the belt 11 at its base as measured substantially on its dedendum line BD is equal to or greater than the distance or space $yb$ between any two belt teeth as measured on this same line. The width Y$b$ of each belt tooth 14 at its base 20 as measured along the longitudinal extent L of the belt may be from about 1½ to about 2 times as great as the width $yb$ between any two belt teeth 14. By the same token, it can be seen that in regard to the pulley 12, the circumferential dimension $xp'$ of the cross section of each pulley tooth 16 as measured at the intersection of the tangents of the flanks 34, 34' thereof with the addendum line PA of the pulley teeth 16 is equal to or less than the circumferential distance X$p'$ between the confronting flanks 34, 34' of any two adjacent pulley teeth 16 as measured at the intersections of the confronting flanks with the same line. It is possible that $xp'$ may vary from about 60 to about 90% of X$p'$.

In this same regard it is preferred that as the belt 11 travels around the pulleys 12 and 13 there is substantially no clearance between the flanks 22, 22' of the belt tooth 14 and the flanks 34, 34' of the pulley teeth 16 so that the spaces between the pulley which define the pulley grooves 17 are substantially completely filled by the belt teeth 14. However, as the belt travels around the toothed pulley 12 and the flanks 22 contact the flanks 34 of the pulley teeth 16 some clearance can be expected between the flanks 22' of the belt teeth and the confronting flanks 34' of the pulley teeth.

According to the preferred embodiment of the invention, when the belt 11 is driven by the pulley 12 as in FIG. 4, the contact between the belt tooth 14 and the pulley tooth 16 continuous from the initial pulley contact point PC on the leading side of the dedendum line PD of the pulley to the final belt contact point BC on the lagging side of the dedendum line BD of the belt. If the belt were driving the pulley, on the other hand, the contact would be continuing from the initial belt contact point on the leading side of the dedendum line of the belt to the final pulley contact point on the lagging side of the dedendum line of the pulley.

Therefore, it is preferred in the practice of the present invention that there be continuous contact along the confronting driving surfaces of the belt and the pulley bounded by the respective dedendum lines thereof and beyond. In this regard it is apparent that the pulley tooth contacting portions of the belt tooth extending substantially between points PC and BC approximate one half of the total outer perimeter or outer surface area O$b$ of the belt tooth 14. During the operation of the drive 10, the portions or fillets 23 of the belt contact approximately one half of the arcuate outer perimeter O$p$ of the portions or crown 33 of the pulley. Additionally, the pulley contacting portions of the tooth 14 including the fillets 23 extend from the ends of the base portion 20 and converge inwardly to form the outermost portion or crown 21 of the tooth 14. Each fillet has a surface contacting area which is at least 30% of the total surface contacting area of one of the pulley tooth contacting portions to thereby increase the shear resistance of each belt tooth.

Also as is seen in FIG. 4 the support provided to the tensile member 19 by the belt tooth 14 of increased height and size relieves the stresses in area *a* of the belt 11 and causes the tensile member 19 to assume a substantially circular or arcuate, (non-chordal) configuration as it travels around the pulleys 12 and 13. The circular or arcuate path of the tensile member 19 corresponds more closely to the theoretical pitch line of the pulleys. This has the effect of producing a more constant angular velocity and less vibration resulting in a smoother, quieter running drive. Moreover, belt life is significantly increased since the wear in area *a* of the belt is reduced.

A more detailed discussion of this aspect of the invention can be found in my previously mentioned co-pending application filed on even date herewith entitled "IMPROVED BELT DRIVE AND BELT AND PULLEYS THEREFOR" the teachings of which are incorporated by reference herein.

The following example further illustrates the objects and advantages of this invention.

EXAMPLE

In order to compare the performance of belts and pulleys the present invention having the novel and unique profiles as herebefore described with those having conventional profiles the following procedure was followed:

Several positive or synchronous drive belt samples were manufactured by conventional methods using conventional materials well-known in the art. All of the belts were formed of a neoprene rubber composition having a nylon fabric facing on the belt teeth and including a tensile member of fiberglass cords disposed substantially on the dedendum line of the belt teeth. The belt samples after manufacture were dynamically tested on toothed pulleys of appropriate dimension and configuration as will be hereinafter described.

Four type belt constructions were tested in combination with suitable corresponding toothed pulley constructions. These combinations are identified as Types I, II, III and IV. In Type I the driving teeth of each belt sample were of the profile of the present invention as shown particularly in FIGS. 1 and 2 of the drawings. All of the belt samples produced had the following dimensions as measured in the longitudinal extent of the belt between the pulleys: a pitch between belt teeth of 9.55 mm (0.376 inches); a width or lineal dimension of the base of the belt tooth of 5.84 mm (0.230 inches) as measured substantially on the dedendum line of the tooth, a height of 3.58 mm (0.141 inches); and a distance between the belt teeth of 3.70 mm (0.146 inches) as measured on the dedendum line of the belt teeth.

The belt tooth included stress-relieving portions or fillets adjoining the opposite sides of the base of the tooth each having an arcuate outer perimeter of 3.00 mm (0.118 inches). The total outer perimeter of the belt tooth was 13.36 mm (0.526 inches). Therefore, the outer perimeter or outer surface area of each fillet constituted 44.91% of one half of the total outer perimeter or outer surface area of the belt tooth. The radius of the arcuate outer surface of each fillet was 2.29 mm (0.090 inches) with the ratio of this radius to the pitch length between adjacent teeth being therefore 0.24 to 1.

Twelve (12) belts of Type I were tested on pulleys each having 18 teeth of the configuration as shown particularly in FIGS. 4 and 5 of the drawings. The circular pitch of the pulley teeth was 9.55 mm (0.376 inches). The outermost portion of the pulley had an arcuate outer perimeter of 5.26 mm (0.207 inches) formed by the arcs of two circles of equal radius spaced at a distance of 0.20 mm (0.008 inches) from the radial center line of the tooth and the pulley tooth had a total outer perimeter of 9.86 mm (0.388 inches). Therefore, one half of the arcuate outer perimeter was 53.35% of one half of the total outer perimeter of the tooth. The arcs forming the outermost portion of the pulley tooth were connected by a flat portion having a linear dimension of 0.40 mm (0.016 inches). The radius of the arc of each circle was 1.68 mm (0.066 inches). The pulley tooth had a height of 3.40 mm (0.134 inches). In the longitudinal extent of the belt the height of the belt teeth was 0.178 mm (0.007 inches) greater than the height of the pulley teeth or depth of the pulley grooves.

The circumferential dimension of the pulley tooth as measured on its dedendum line was 3.89 mm (0.153 inches). Consequently, the circumferential dimension of each belt driving tooth which approximates its lineal dimension or width is about 1½ times greater than the circumferential dimension of the pulley tooth.

The circumferential dimension of the cross section of each pulley tooth as measured at the intersection of the tangents of the tooth flanks with the addendum line of the pulley teeth was 3.76 mm (0.148 inches) and the circumferential distance between the confronting flanks of any two adjacent pulley teeth as measured at the intersection of the confronting flanks with the addendum line of the pulley teeth was 5.54 mm (0.218 inches). The circumferential dimension of the cross section of each pulley tooth was therefore 67.87% of the circumferential distance between adjacent pulley teeth as measured as described above.

In the Type II combination the power transmission belts were of a conventional type having trapezoidal teeth as is well-known in the prior art (Case U.S. Pat. No. 2,507,852). Three (3) belt samples were tested having the following dimensions as measured in the longitudinal extent of the belt between the pulleys: a pitch between belt teeth of 9.55 mm (0.376 inches); a width or lineal dimension of the base or root of the belt tooth of 4.64 mm (0.183 inches) as measured substantially on the dedendum line of the tooth; a belt tooth height of 1.91 mm (0.075 inches); and a distance between the belt teeth of 4.90 mm (0.193 inches) as measured on the dedendum line of the belt teeth.

Each tooth included a fillet at each opposite side of the base thereof. Each fillet had an arcuate outer perimeter of 0.62 mm (0.024 inches) and the radius of the arcuate outer surface of the fillet was 0.51 mm (0.020 inches). The total outer perimeter of the belt tooth was 7.37 mm (0.290 inches). Each fillet therefore had an outer perimeter or outer surface area which was 16.82% of one half of the total outer perimeter or outer surface area of the belt tooth. The ratio of the radius of the arcuate outer surface of the fillet to the pitch length between adjacent belt teeth was 0.053 to 1.

The belts of the Type II construction were used with pulleys of conventional cross-sectional configuration. The pulleys included 18 radially projecting trapezoidal teeth having a uniform height of 2.13 mm (0.084 inches). The circular pitch of the pulley teeth was 9.55 mm (0.376 inches). In the longitudinal extent of the belt the height of each belt tooth was 0.22 mm (0.009 inches) less than the height of the pulley teeth or depth of the pulley grooves.

The circumferential dimension of each pulley tooth as measured on its dedendum line was 5.28 mm (0.208 inches) or about 88% of the circumferential dimension (width) of each belt tooth as measured on its dedendum line.

The circumferential dimension of the cross section of each pulley tooth as measured at the intersection of the tangents of the tooth flanks with the addendum line of the pulley teeth was 4.65 mm (0.183 inches) and the circumferential distance between the confronting flanks of any two adjacent teeth as measured at the intersection of the confronting flanks with the addendum line of the pulley teeth was also 4.65 mm (0.183 inches).

The Type III combinations included a belt having a belt tooth of conventional configuration as in the case of Type II. Four (4) belt samples were produced having the following dimensions as measured in the longitudinal extent of the belt between the pulleys: the pitch between belt teeth of 12.70 mm (0.500 inches); a width or linear dimension of the base of the belt tooth of 6.10 mm (0.240 inches) as measured substantially on the dedendum line of the tooth; a belt tooth height of 2.29 mm (0.090 inches) and a distance between the belt teeth of 6.60 mm (0.260 inches) as measured on the dedendum line of the belt teeth.

Each tooth included a fillet at each opposite side of the base thereof each having an arcuate outer perimeter of 1.24 mm (0.049 inches) and a radius of 1.02 mm (0.040 inches). The total outer perimeter of the belt tooth was 9.40 mm (0.370 inches). Each fillet therefore had an outer perimeter or outer surface area which was 26.38% of one half of the total outer perimeter or outer surface area of the belt tooth. The ratio of the radius of the arcuate outer surface of the fillet to the pitch length between adjacent belt teeth was 0.080 to 1.

The belts of the Type III construction were tested on conventional pulleys of similar cross section to the pulleys of Type II. The pulleys of Type III included 14 pulley teeth of trapezoidal cross section having a height of 2.59 mm (0.102 inches). The pitch distance between pulley teeth was 12.70 mm (0.500 inches). In the longitudinal extent of the belt the height of each belt tooth of the belts of Type III was 0.305 mm (0.012 inches) less than the height of the pulley teeth or depth of the pulley grooves.

The circumferential dimension of each pulley tooth as measured on its dedendum line was 7.21 mm (0.284 inches) or about 87% of the circumferential dimension (width) of each belt tooth as measured on its dedendum line.

The circumferential dimension of the cross section of each pulley tooth as measured at the intersection of the tangents of the tooth flanks with the addendum line of the pulley teeth was 6.27 mm (0.247 inches) and the circumferential distance between the confronting flanks of any two adjacent teeth as measured at the intersection of the confronting flanks with the addendum line of the pulley teeth was 6.12 mm (0.241 inches). This circumferential dimension of the cross section of each pulley tooth was therefore 102.45% of the circumferential distance between adjacent pulley teeth.

In the Type IV belt assembly the belts had a tooth configuration of the type shown in Miller U.S. Pat. No. 3,756,091 with the teeth being of a curvilinear cross-sectional configuration. Three (3) belt samples were tested in a belt drive in combination with pulleys of appropriate corresponding contour with the pulley teeth having mating substantially conjugate curvilinear cross-sections. All of the belt samples produced had the following dimensions as measured in the longitudinal extent of the belt between the pulleys: a pitch between belt teeth of 8 mm (0.315 inches): a width or lineal dimension of the base of the belt tooth of 5.18 mm (0.204 inches) as measured substantially on the dedendum line of the tooth; a belt tooth height of 3.60 mm (0.142 inches); and a distance between the belt teeth of 2.82 mm (0.111 inches) as measured on the dedendum line of the belt teeth.

Each tooth included a fillet at each opposite side of the base thereof each having an arcuate outer perimeter of 1.20 mm (0.047 inches) and a radius of 0.76 mm (0.030 inches). The total outer perimeter of the belt tooth was 11 mm (0.430 inches). Each fillet therefore had an outer perimeter or outer surface area which was 21.86% of one half of the total outer perimeter or outer surface area of the belt tooth. The ratio of the radius of the arcuate outer surface of the fillet to the pitch length between adjacent belt teeth was 0.095 to 1.

The belts of the Type IV construction were used with pulleys of the type disclosed in FIG. 3 of Miller U.S. Pat. No. 3,756,091 with the pulley teeth being of a curvilinear cross sectional configuration. The pulleys of the Type IV construction included 22 radially projecting teeth having a uniform height of 3.68 mm (1.145 inches). The circular pitch of the pulley teeth was 8 mm (0.315 inches). In the longitudinal extent of the belt the height of each belt tooth was 0.08 mm (0.003 inches) less than the height of the pulley teeth or depth of the pulley grooves.

Each pulley tooth as measured on its dedendum line had a circumferential dimension of 2.29 mm (0.090 inches). Each belt tooth therefore had a circumferential dimension closely approximating the lineal dimension of about 2¼ to 1 in relation to the circumferential dimension of each pulley tooth.

The circumferential dimension of the cross section of each pulley tooth as measured at the intersection of the tangents of the tooth flanks with the addendum line of the pulley teeth was 1.91 mm (0.075 inches) and the circumferential distance between the confronting flanks of any two adjacent teeth as measured at the intersection of the confronting flanks with the addendum line of the pulley teeth was 5.89 mm (0.232 inches). Accordingly, this circumferential dimension of the cross section of each pulley tooth was 32.43% of the circumferential distance between adjacent pulley teeth.

The belts of Type I, II, III and IV were dynamically tested in accordance with the following procedure. The belts were mounted on a standard water brake tester including a three-pulley arrangement which consisted of a driver, a driven and an idler pulley. The belts were tested at a drive load of 8206 watts (11 horsepower) with each belt installed at 600 N(135 lbs) strand tension. In the testing of belts of Type I and II the driver and driven pulleys had an outside diameter of 53.30 mm (2.099 inches) and the backside outer pulley had a diameter of 76.20 mm (3 inches). In the tests of Type III the driver and driven pulleys had an outside diameter of 55.20 mm (2.174 inches) and the backside outer pulley was of the same dimensions as in the tests of Types I and II. The belts of Type IV were tested on a driver and driven pulley having an outside diameter of 49.78 mm (1.960 inches) with the backside idler pulley again having a diameter of 76.20 mm (3 inches). The belts were tested to failure unless otherwise noted and the lapsed time to the nearest hour to failure of each belt sample is presented in Table A with the average time to failure of each group of belt samples being reported.

TABLE A
(WATER BRAKE TEST)

| Type | Belts | Time to Failure (Hours) | Remarks |
|---|---|---|---|
| I | 1 | 144 | Not tested on same pulleys |
|  | 2 | 562 |  |
| I | 3 | 248 | Machine Failure |
|  | 4 | 33 | Removed prior to failure |
|  | 5 | — | Not tested |
|  | 6 | 653 |  |
|  | 7 | 330 |  |
|  | 8 | 330 |  |
|  | 9 | 582 |  |
|  | 10 | 195 |  |
|  | 11 | 520 |  |
|  | 12 | 101 | Defective belt |
|  |  | 409 Avg |  |
| II | 1 | 167 |  |
|  | 2 | 271 |  |
|  | 3 | 211 |  |
|  |  | 216 Avg |  |
| III | 1 | 106 |  |
|  | 2 | 183 |  |
|  | 3 | 350 |  |
|  | 4 | 127 |  |
|  |  | 192 Avg. |  |
| IV | 1 | 423 |  |
|  | 2 | 335 |  |
|  | 3 | 143 | Removed prior to failure |
|  |  | 379 Avg |  |

The data in Table A indicate that the belts and pulleys of Type I having the unique belt and pulley toothed profiles of the present invention have a significantly improved belt life over belts and pulleys of Types II, III and IV having belt and pulley tooth profiles of the prior art.

Furthermore, the drives including the belts and pulleys of Type I were observed to operate with less noise and vibration than in those drives including the belts and pulleys of Types II, III and IV.

While certain representative embodiments and details have been shown for the purpose of illustrating the invention, it will be apparent to those skilled in this art that various changes and modifications may be made therein without departing from the spirit or scope of the invention.

What is claimed is:

1. A flexible power transmission belt having a plurality of flexible resilient teeth of uniform pitch length extending transversely thereof, each said tooth as viewed in longitudinal section comprising a base portion, an outermost portion spaced from said base portion and having a cross sectional dimension less than the cross sectional dimension of said base portion and opposite side portions extending from the ends of said base portion and converging inwardly to meet the ends of the outermost portion to thereby define the tooth profile, each said side portion including an integral stress-relieving portion adjoining the base portion, said stress-relieving portion having an outer perimeter which is at least 30% of one half of the total outer perimeter of said tooth.

2. The belt as claimed in claim 1 wherein the outer perimeter of one said stress-relieving portion is from about 35 to about 100% of one half of the total outer perimeter of said tooth.

3. The belt as claimed in claim 1 wherein the outer perimeter of said stress-relieving portion is from about 40 to about 60% of one half of the total outer perimeter of said tooth.

4. The belt as claimed in claim 1 wherein the outer perimeter of said stress-relieving portion is curvilinear.

5. The belt as claimed in claim 1 wherein the outer perimeter of said stress-relieving portion is rectilinear.

6. The belt as claimed in claim 4 wherein the outer perimeter of said stress-relieving portion is defined by an arc of a circle whose center lies between the belt teeth with the ratio of the radius of said arc to the pitch length between adjacent teeth being from about 0.16:1 to about 0.32:1.

7. The belt as claimed in claim 5 wherein the outer perimeter of said stress-relieving portion is defined by the chord of an arc of a circle whose center lies between adjacent belt teeth and the ratio of the radius of said arc to the pitch length between adjacent teeth is from about 0.16:1 to about 0.32:1.

8. A positive drive power transmission belt of integral unitary construction having a body of flexible resilient material including a plurality of driving teeth of substantially uniform cross section extending generally transversely thereof and an endless tensile member therein disposed substantially on the dedendum line of said teeth, each said tooth comprising a crown at a distance furthest from said tensile member, a root at a distance nearest to said tensile member and having a width greater than the width of said crown, and opposite flanks extending from the ends of said crown to the ends of said root, each said flank including a fillet adjoining said root, said fillet having an outer surface area which is at least 30% of one half of the total outer surface area of said tooth to thereby increase the shear resistance of each said tooth.

9. The belt as claimed in claim 8 wherein said fillet has an outer surface area which is at least 50% of one half of the total surface area of said tooth.

10. The belt as claimed in claim 8 wherein the outer surface area of said fillet is from about 35 to about 100% of one half of the total surface area of said tooth.

11. The belt as claimed in claim 8 wherein the outer surface area of said fillet is from about 40 to about 60% of the total surface area of one half of said tooth.

12. The belt as claimed in claim 8 wherein said fillet has a curvilinear outer surface the edge of which is formed by at least one arc of a circle whose center lies outside of said body in the space between the belt teeth.

13. The belt as claimed in claim 8 wherein said fillet has a rectilinear outer surface the edge of which is formed by at least one chord of an arc of a circle whose center lies outside of the body between the belt teeth.

14. The belt as claimed in claim 12 wherein the ratio of the radius of the arc forming the edge of the outer surface of said fillet to the pitch length between adjacent teeth is from about 0.16:1 to about 0.32:1.

15. The belt as claimed in claim 13 wherein the ratio of the radius of the arc of the chord forming the edge of the outer surface of said fillet to the pitch length between adjacent teeth is from about 0.16:1 to about 0.32:1.

16. A positive drive system comprising in combination the belt of claim 8 and at least one pulley having a plurality of uniformly spaced radially projecting teeth, each said tooth as viewed in planes perpendicular to the rotational axis of the pulley comprising a crown, a root spaced from said crown, and opposite flanks extending from the ends of said crown to the ends of said root, each said crown having an outer arcuate surface area the edges of which are defined by at least one arc of a circle whose center lies within said pulley tooth with the crown having an outer surface area which is at least 30% of one half of the total outer surface area of the tooth and with the crown contacting said fillet during the operation of the belt.

17. The system as claimed in claim 16 wherein in the longitudinal extent of the belt between the pulleys, the height of the belt teeth is greater than the height of the pulley teeth and said belt driving teeth provide support for said tensile member and said tensile member assumes a substantially arcuate, non-chordal configuration as it travels around the pulleys.

18. The system as claimed in claim 17 wherein as the belt travels around the pulleys there is substantially no clearance between the flanks of said belt teeth and the flanks of said pulley teeth.

19. The system as claimed in claim 18 wherein the circumferential dimension of each belt driving tooth is about twice as great as said circumferential dimension of each pulley tooth.

20. The belt as claimed in claim 8 where the witdh of each said root as measured substantially on the dedendum line of the belt teeth is equal to or greater than the distance between any two said teeth as measured on the dedendum line of the belt teeth.

21. The belt as claimed in claim 20 wherein said width of each said belt tooth is from about 1¼ to about 2 times greater than said distance between any two said teeth.

22. A positive drive system comprising the combination of a positive drive belt and a pair of toothed pulleys operating in conjunction therewith, the belt including a body of flexible polymeric material having a tensile member of high modulus essentially inextensible material embedded therein and a plurality of driving teeth of substantially uniform cross-sectional configuration formed in at least one surface thereof which extend generally transversely of the belt and are adapted to mesh without any significant change of pitch with teeth of the toothed pulleys, the tensile member disposed substantially on the dedendum line of the driving teeth thereof, each driving tooth of the belt, when viewed in longitudinal cross section as the belt travels around the pulleys, comprising a base portion nearest to said tensile member and opposite pulley tooth contacting portions extending from the ends of said base portion and converging inwardly to form the outermost portion of said tooth and thereby defining the tooth profile, each said pulley contacting portion including a fillet of flexible material integrally joined to said base portion, each fillet having a surface contacting area which is at least 30% of the total surface contacting area of one said pulley tooth contacting portion to thereby increase the shear resistance of each belt tooth.

23. The system as claimed in claim 22 wherein said fillet has an outer surface area which is at least 50% of the total surface area of one said pulley contacting portion.

24. The system as claimed in claim 22 wherein the outer surface area of said fillet is from about 35 to about 100% of the total surface area of one said pulley contacting portion.

25. The system as claimed in claim 22 wherein the outer surface area of said fillet is from about 40 to about 60% of the total surface area of one said pulley contacting portion.

26. The system as claimed in claim 22 wherein said fillet has a curvilinear outer surface the edge of which is formed by at least one arc whose center lies outside of said body in the space between the belt teeth.

27. The system as claimed in claim 22 wherein said fillet has a rectilinear outer surface the edge of which is formed by at least one chord of an arc whose center lies outside of the body between the belt teeth.

28. The system as claimd in claim 26 wherein the ratio of the radius of the arc forming the edge of the outer surface of said fillet to the pitch length between adjacent teeth is from about 0.16:1 to about 0.32:1.

29. The system as claimed in claim 27 wherein the ratio of the radius of the arc of the chord forming the edge of the outer surface of said fillet to the pitch length between adjacent teeth is from about 0.16:1 to about 0.32:1.

30. The system as claimed in claim 22 wherein each said toothed pulley includes a plurality of radially projecting teeth with each tooth having a height which is less than the height of each belt driving tooth in the longitudinal extent of the belt between the pulleys, and wherein as the belt travels around the pulleys the outermost portion of the addendum of the belt driving teeth frictionally engage the surfaces of the dedendum of the pulley between the pulley teeth with said belt driving teeth being compressed a limited amount to cause the radially outer extremities of the pulley teeth to simultaneously frictionally engage the surfaces of the dedendum of the belt between the belt driving teeth.

31. The system as claimed in claim 22 wherein the height of each tooth of the pulley is from about 1 to about 15% less than the height of each driving tooth of the belt in engagement therewith.

32. The system as claimed in claim 22 wherein the height of each tooth of the pulley is from about 3 to about 7% less than the height of each driving tooth of the belt in engagement therewith.

33. The system as claimed in claim 22 wherein the height of each tooth of the pulley is about 5% less than the height of each driving tooth of the belt in engagement therewith.

34. The system as claimed in claim 22 wherein as the belt travels around the pulleys the circumferential dimensions of each belt driving tooth as measured on its dedendum line is equal to or greater than the circumferential dimension of each pulley tooth as measured on its dedendum line.

35. The system as claimed in claim 34 wherein said circumferential dimension of each belt driving tooth is from about 1¼ to about 1¾ greater than said circumferential dimension of each pulley tooth.

36. A toothed pulley for use with a toothed power transmission belt, said pulley having a plurality of uniformly spaced radially projecting teeth, each said tooth as viewed in planes perpendicular to the rotational axis of the pulley comprising a base portion, an outermost portion spaced from said base portion and opposite side portions extending from the ends of said base portion joining the ends of the outermost portion to thereby define the pulley tooth profile, said outermost portion having an arcuate outer perimeter formed by the arc of at least one circle whose center point lies within said tooth with one half of said arcuate outer perimeter being at least 30% of one half of the total outer perimeter of said tooth.

37. The pulley as claimed in claim 36 wherein said arcuate outer perimeter is from about 35 to about 100% of one half of the total outer perimeter of said tooth.

38. The pulley as claimed in claim 36 wherein said arcuate outer perimeter is from about 40 to about 60% of one half of the total outer perimeter of said tooth.

39. The pulley as claimed in claim 38 wherein the circumferential dimension of the cross section of each pulley tooth as measured at the intersection of the tangents of the flanks thereof with the addendum line of the pulley teeth is equal to or less than the circumferential distance between the confronting flanks of any two said adjacent pulley teeth as measured at the intersection of the tangents of said confronting flanks with the addendum line of the pulley teeth.

40. The pulley as claimed in claim 39 wherein said circumferential dimension of each said pulley tooth is from about 60 to about 90% of said circumferential distance between any two said pulley teeth.

41. The pulley as claimed in claim 36 wherein said outermost portion has an arcuate outer perimeter formed by the arcs of two circles of equal radius spaced at an equal distance from the radial center line of said tooth with said arcs connected by a flat portion therebetween said flat portion having a linear dimension less than the length of any one said arc.

42. The pulley as claimed in claim 36 wherein said uppermost portion has an outer perimeter formed by the arc of a single circle whose center line lies on the radial center line of said tooth.

43. The pulley as claimed in claim 36 wherein the radius R of said arc is equal to 0.165 P + 0.0012 P (N-9) wherein P = The circular pitch of the pulley teeth and
N = The number of pulley teeth.

* * * * *

UNITED STATES PATENT AND TRADEMARK OFFICE
CERTIFICATE OF CORRECTION

PATENT NO. : 4,041,789
DATED : August 16, 1977
INVENTOR(S) : Ronald D Hoback

It is certified that error appears in the above-identified patent and that said Letters Patent are hereby corrected as shown below:

Column 2, line 38, after "application" insert "Serial No. 642,090 filed December 18, 1975,"

Column 7, line 53, after "teeth" insert "is"

Column 12, line 30, "(1.145 inches) should be "(0.145 inches)

Claim 1, line 3, after "extending" insert "generally".

Signed and Sealed this

Ninth Day of May 1978

[SEAL]

Attest:

RUTH C. MASON
Attesting Officer

LUTRELLE F. PARKER
Acting Commissioner of Patents and Trademarks